United States Patent
Sathyanarayana et al.

(10) Patent No.: US 12,520,037 B1
(45) Date of Patent: Jan. 6, 2026

(54) INTERACTIVE METHOD TO GUIDE A HUMAN TO A PRECISE LOCATION BASED ON A WIDER IMAGE OF THE AREA AROUND THE LOCATION

(71) Applicant: HITACHI, Ltd., Tokyo (JP)

(72) Inventors: Supriya Sathyanarayana, Milpitas, CA (US); Joydeep Acharya, Milpitas, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/889,093

(22) Filed: Sep. 18, 2024

(51) Int. Cl.
  *H04N 23/60* (2023.01)
  *G06V 10/12* (2022.01)
  *G06V 10/25* (2022.01)

(52) U.S. Cl.
  CPC .............. *H04N 23/64* (2023.01); *G06V 10/12* (2022.01); *G06V 10/25* (2022.01)

(58) Field of Classification Search
  CPC ...................................................... G06V 10/25
  USPC ......................................................... 348/125
  See application file for complete search history.

(56) References Cited

U.S. PATENT DOCUMENTS

| | | | |
|---|---|---|---|
| 9,204,257 B1 | 12/2015 | Mendelson | |
| 11,026,067 B2 | 6/2021 | Martin et al. | |
| 11,216,932 B1* | 1/2022 | Checka | G06T 7/0002 |
| 12,099,017 B2* | 9/2024 | Kigawa | G06T 7/11 |
| 2011/0038009 A1* | 2/2011 | Cooper | H04N 1/40025 358/3.06 |
| 2024/0377640 A1* | 11/2024 | Asaban | H04N 13/239 |

* cited by examiner

*Primary Examiner* — Justin W Rider
(74) *Attorney, Agent, or Firm* — PROCOPIO, CORY, HARGREAVES & SAVITCH LLP (57) ABSTRACT

Systems and methods described herein can involve in response to receiving, at a system, a set of images associated with a first area of interest, processing the set of images to generate a first image description; communicating the first image description and the set of images to a user device to enable the user device to locate a second area of interest; in response to the user navigating to the second area of interest, using a positioning system and capturing a new image by pointing a camera in any direction, obtaining the new image at the system and processing the new image; obtaining a second image description associated with the new image; comparing the first image description with the second image description to obtain a comparison result; and based on the comparison result, communicating to the user device instructions for adjusting the camera.

20 Claims, 10 Drawing Sheets

INTERACTIVE METHOD TO GUIDE A HUMAN TO A PRECISE LOCATION BASED ON A WIDER IMAGE OF THE AREA AROUND THE LOCATION

BACKGROUND

Field

The present disclosure is generally directed to computer vision applications, and more specifically, to systems and methods for guided visual diagnosis systems and methods for vision-based monitoring applications.

Related Art

Navigating to a pin-pointed/precise location corresponding to a physical object, defect etc. often requires a systematic approach to ensure efficient resolution. For example, in a factory setting, the identification of defects in machinery often requires a systematic approach to ensure efficient resolution. A first worker may discover a defect in a machine, which then necessitates an inspection by a second worker to address the detected issue. An effective and streamlined method to guide the second worker to the exact location of the defect is essential for maintaining operational efficiency.

This requirement is equally pertinent in scenarios where autonomous robots navigate physical environments, capture image data, and process this data to detect defects. The challenge comprises two primary components: navigating the worker to the approximate location of the defective machine within the factory, and guiding the worker to precisely identify the specific location of the defect.

To address the second component of the problem, existing solutions that focus on defect localization or navigation assistance exhibit several limitations. Current methods lack the necessary precision to allow workers to easily and accurately pinpoint defects. These methods often rely on a single mode of communication, such as heat maps or directional arrows, which are effective only when the worker is already in close proximity to the defect location.

Furthermore, when a defect is detected by a robot, existing guidance methods for workers involve the use of point cloud maps and waypoints to correlate the defect-detected images with the environment. However, these methods are not intuitive or user-friendly for workers to follow.

Some approaches, utilize ultra-wideband technology for indoor positioning, which requires tags to be secured to the location of interest. While such systems aim for accurate positioning, they do not provide an interactive method to guide the positioning process. Another approach uses RF Bluetooth beacons to map a localized area, display an indoor map, and determine the location of a mobile device on the localized area indoor map. This method is useful for navigating in GPS-denied indoor environments, achieving a localization accuracy of approximately two meters. However, it only facilitates reaching close proximity to the location of interest.

Therefore, it is desirable to have systems and methods that overcome these limitations by providing solutions that enable workers to quickly and easily locate defects within a physical environment. In embodiments, this is achieved following the detection of defects by either another worker or a robot equipped with cameras, such as a robotic dog or mobile robot. Various embodiments enhance the accuracy and efficiency of defect localization in industrial settings.

In embodiments, a method for precisely locating a region of interest (ROI) in the physical world uses images captured by a mobile device of the ROI's surroundings and guides a user to accurately locate a defect detected by a robot in a factory or another user. This improves the accuracy and user-friendliness of defect localization, thereby enhancing operational efficiency and precision in industrial settings.

SUMMARY

In some aspects of the disclosure, a method for using a set of images to pin-point a precise location (e.g. in 3D) of a physical object (e.g. a defect on an item), which may be associated with defect, e.g., a machine defect in a factory or other confined space, such as in a rail car that is being assembled on a factory floor, comprises: in response to receiving, at a system, a set of images associated with a first area of interest, processing the set of images to generate a first image description; communicating the first image description and the set of images to a user device to enable a user of the user device to locate a second area of interest; in response to the user navigating to the second area of interest, using a positioning system and capturing a new image by pointing a camera in any direction, obtaining the new image at the system and processing the new image; obtaining a second image description associated with the new image, wherein at least one of the first image description or the second image description includes natural language; comparing the first image description with the second image description to obtain a comparison result; and based on the comparison result, communicating to the user device instructions for adjusting the camera.

In some aspects, the techniques described herein relate to a method, wherein the comparison result is used to determine a direction and/or an amount of a camera adjustment.

In some aspects, the techniques described herein relate to a method, wherein communicating includes, in response to the camera pointing to any direction, communicating to the user device instructions that cause at least one of an instruction in natural language, an arrow to be displayed on the image, a heat map indicating a proximity to the first area of interest, or a bounding box indicating the first area of interest, or any of their combination.

In some aspects, the techniques described herein relate to a method, further including iteratively performing guidance steps until the first area of interest satisfies at least one of a predefined accuracy or a stop condition.

In some aspects, the techniques described herein relate to a method, wherein the instruction in natural language describes physical objects and their relationships to the first area of interest.

In some aspects, the techniques described herein relate to a method, wherein the system uses an image description algorithm to process at least one of the new image or the first image.

In some aspects, the techniques described herein relate to a method, further including combining a depth map with one or more RGB images.

In some aspects, the techniques described herein relate to a method, wherein the combining enhances an accuracy of the first image description or the second image description.

In some aspects, the techniques described herein relate to a non-transitory computer-readable medium for storing instructions for executing a process, the instructions including: in response to receiving, at a system, a set of images associated with a first area of interest, processing the set of images to generate a first image description; communicating the first image description and set of images to a user device to enable a user of the user device to locate a second area of interest; in response to the user navigating to the second area of interest, using a positioning system and capturing a new image by pointing a camera in any direction, obtaining the new image at the system and processing the new image; obtaining a second image description associated with the new image, wherein at least one of the first image description or the second image description includes natural language; comparing the first image description with the second image description to obtain a comparison result; and based on the comparison result, communicating to the user device instructions for adjusting the camera.

In some aspects, the techniques described herein relate to a non-transitory computer-readable medium wherein the comparison result is used to determine a direction and/or an amount of a camera adjustment.

In some aspects, the techniques described herein relate to a non-transitory computer-readable medium, wherein the step of communicating includes, in response to the camera pointing to any direction, communicating to the user device instructions that cause at least one of an instruction in natural language, an arrow to be displayed on the image, a heat map indicating a proximity to the first area of interest, or a bounding box indicating the first area of interest, or any of their combination.

In some aspects, the techniques described herein relate to a non-transitory computer-readable medium, further including iteratively performing guidance steps until the first area of interest satisfies at least one of a predefined accuracy or a stop condition.

In some aspects, the techniques described herein relate to a non-transitory computer-readable medium wherein the instruction in natural language describes physical objects and their relationships to the first area of interest.

In some aspects, the techniques described herein relate to a non-transitory computer-readable medium, wherein the system uses an image description algorithm to process at least one of the new image or the first image.

In some aspects, the techniques described herein relate to a non-transitory computer-readable medium, further including combining a depth map with one or more RGB images.

In some aspects, the techniques described herein relate to a system for using a set of images to pin-point a precise location of a physical object, which may be associated with defect, e.g., a machine defect in a factory or other confined space, such as in a rail car that is being assembled on a factory floor, the system comprising: a first interface configured to receive a set of images associated with a first area of interest; a second interface configured to couple to a user device; a processor, configured to: in response to receiving, at the first interface, the set of images, process the set of images to generate a first image description; communicate the first image description and the set of images to the user device to enable a user of the user device to locate a second area of interest; in response to the user navigating to the second area of interest, using a positioning system and capturing a new image by pointing a camera in any direction, obtain the new image at the second interface and processing the new image; obtain a second image description associated with the new image, wherein at least one of the first image description or the second image description includes natural language; compare the first image description with the second image description to obtain a comparison result; and based on the comparison result, communicate to the user device instructions for adjusting the camera.

In some aspects, the techniques described herein relate to a system, wherein the processor uses the comparison result to determine a direction and/or an amount of a camera adjustment.

In some aspects, the techniques described herein relate to a system, wherein the processor combines a depth map with one or more RGB images.

In some aspects, the techniques described herein relate to a system, wherein communicating includes, in response to the camera pointing to any direction, communicating to the user device instructions that cause at least one of an instruction in natural language, an arrow to be displayed on the image, a heat map indicating a proximity to the first area of interest, or a bounding box indicating the first area of interest, or any of their combination.

In some aspects, the techniques described herein relate to a system, wherein the instruction in natural language describes physical objects and their relationships to the first area of interest.

Aspects of the present disclosure can involve a system, which can involve means for performing steps comprising: in response to receiving a set of images associated with a first area of interest, processing the set of images to generate a first image description; means for communicating the first image description and the set of images to a user device to enable a user of the user device to locate a second area of interest; means for, in response to the user navigating to the second area of interest using, a positioning system and capturing a new image by pointing a camera in any direction, obtaining the new image at the system and processing the new image; means for obtaining a second image description associated with the new image, wherein at least one of the first image description or the second image description includes natural language; means for comparing the first image description with the second image description to obtain a comparison result; and means for, based on the comparison result, communicating to the user device instructions for adjusting the camera.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 1:
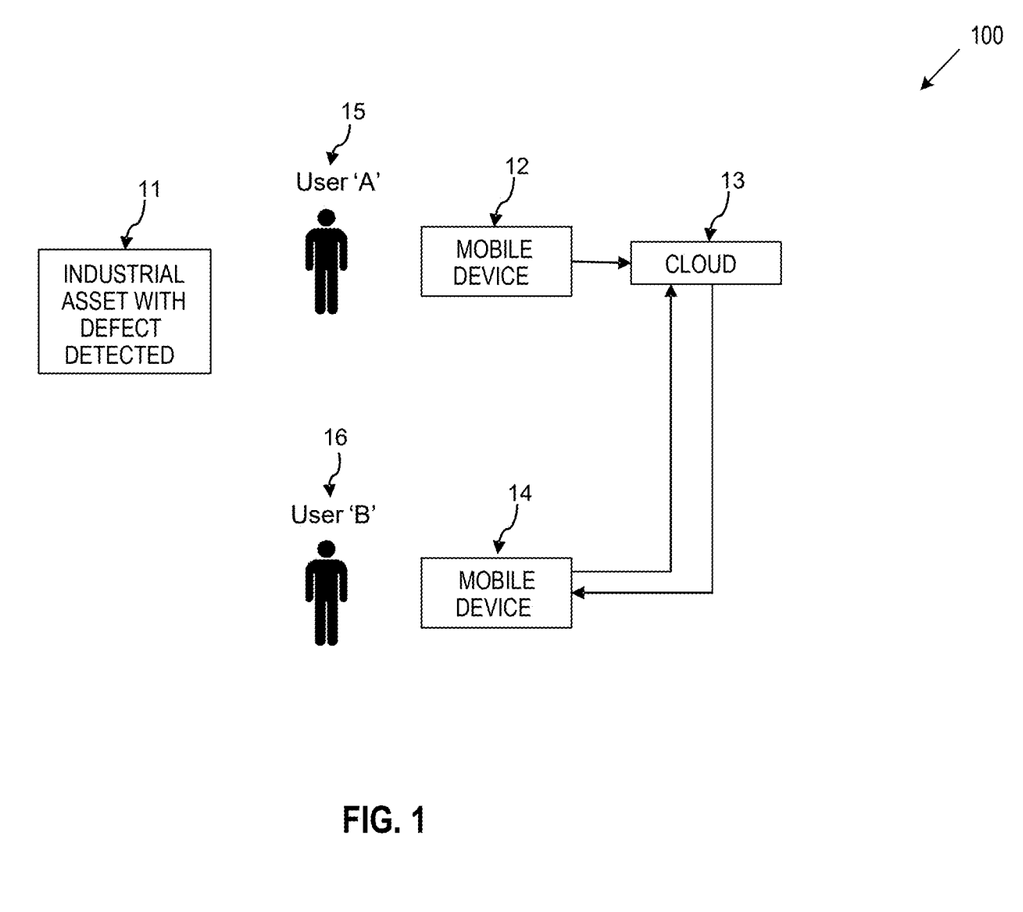
FIG. 1 is a system block diagram illustrating an overall system according to various embodiments of the present disclosure.

FIG. 1 is a system block diagram illustrating an overall system according to various embodiments of the present disclosure. In system 100, user 'A' 15 may detect a defect in an area of interest of industrial asset 11 and use mobile device 12 to communicate the information via cloud 13 to user 'B' 16. Conversely, user 'B' 16 may use mobile device 14 to receive data from cloud 13, which comprises information about the surroundings of industrial asset 11. This information guides user 'B' 16 to precisely locate the defect in the area of interest associated with industrial asset 11.

Figure 2:
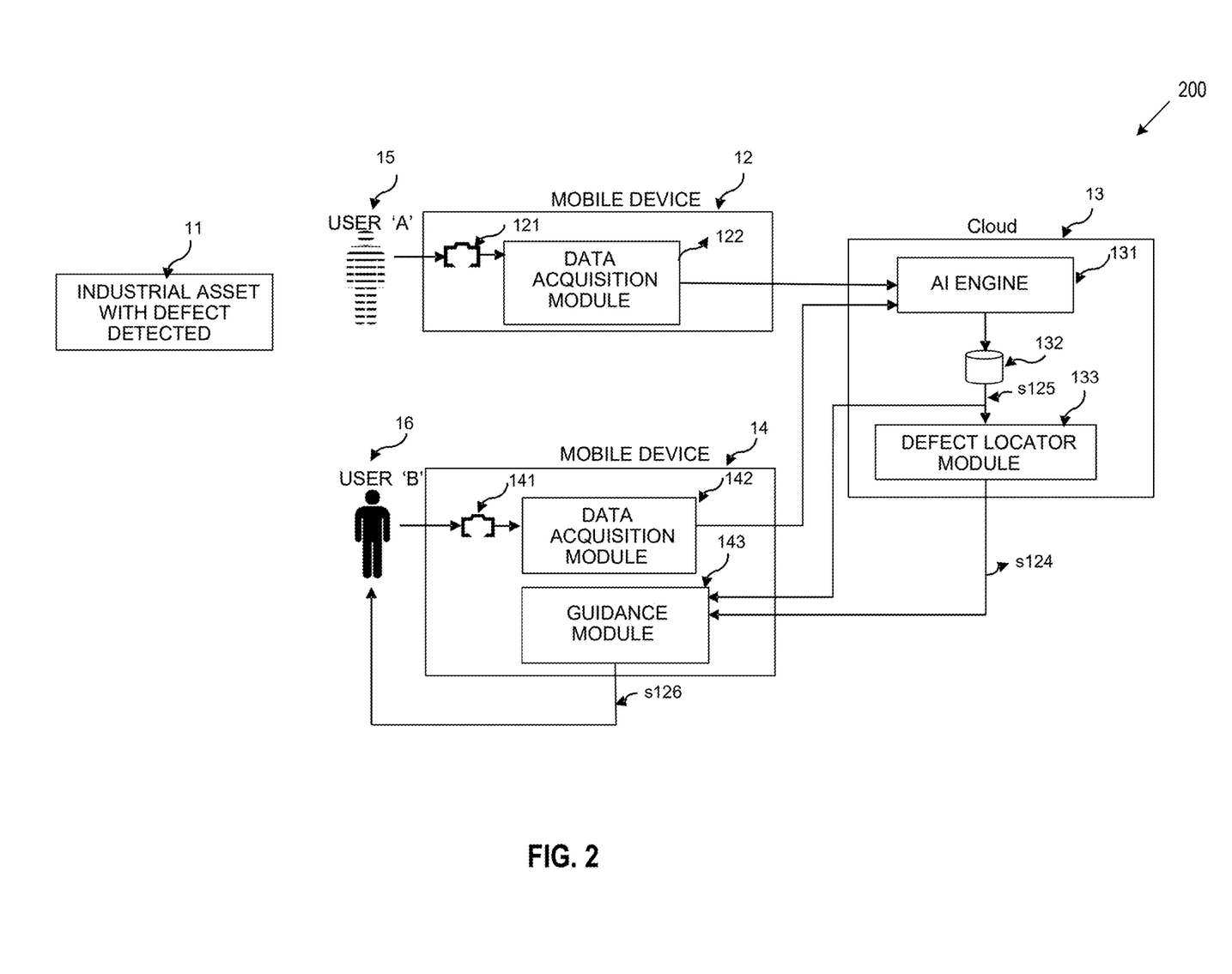
FIG. 2 is a system block diagram illustrating details of the system shown in FIG. 1.

FIG. 2 is a system block diagram illustrating details of the system shown in FIG. 1. Similar numbers depict similar items. In embodiments, system 200 comprises industrial asset 11; mobile devices 12 and 14, each equipped with respective vision sensors 121 and 141; AI engine 131 comprising database 132 and defect locator module 133; data acquisition modules 122 and 142; and guidance module 143.

In operation, user 'A' 15 uses mobile device 12 comprising data acquisition module 122, which interfaces with vision sensor 121, to capture images of industrial asset 11 and its surroundings. Similarly, user 'B' 16 uses mobile device 14 comprising data acquisition module 142, which interfaces with vision sensor 141, to capture images. AI Engine 131 comprises an image description generator (not shown in FIG. 2) that generates descriptions s125 of images of industrial asset 11 and its surroundings captured by mobile device 12 and stores them in database 132. In embodiments, image descriptions s125 may comprise a natural language description of an image that describes an object within an image. Image descriptions s125 may further comprise relationships between objects and other information useful for identifying and locating objects in the physical world.

In embodiments, defect locator module 133 uses image descriptions s125 as inputs to generate any number of signals s124 that are provided to guidance module 143. In turn, guidance module 143, which may be implemented in mobile device 14, interfaces with both defect locator module 133 and user 'B' 16 to guide user 'B' to locate the defect, e.g., by generating instructions s126 to find the precise location of the defect. As depicted in FIG. 2, image descriptions s125 may also be provided to guidance module 143.

Figure 3:
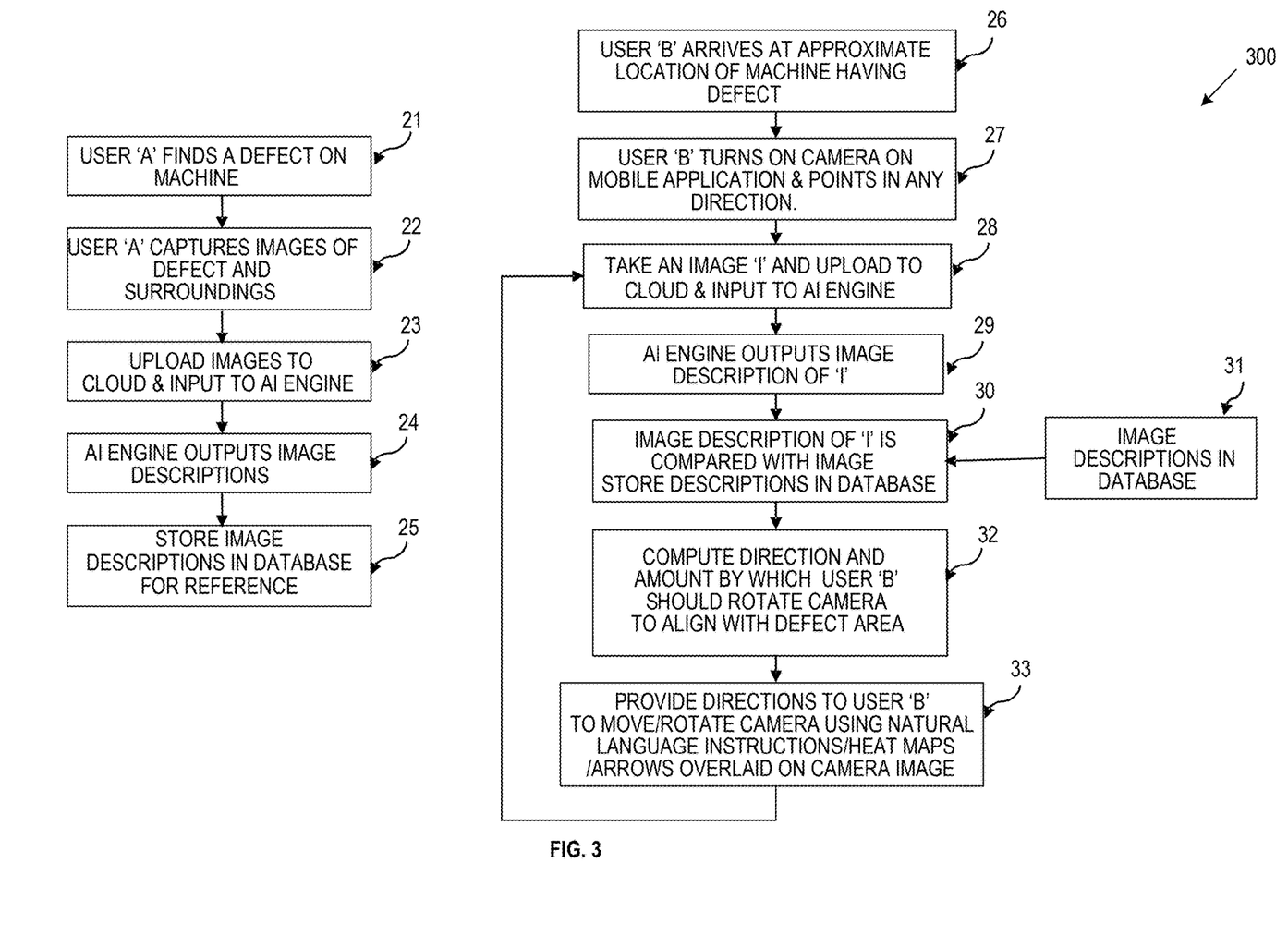
FIG. 3 illustrates an overall process according to various embodiments of the present disclosure.

FIG. 3 illustrates an overall process according to various embodiments of the present disclosure. In process 300, steps 21-25 may be viewed as an initial inspection that is performed by a first user 'A' who captures images of a defect and its surroundings. Conversely, steps 26-33 in process 300 may be viewed as an interactive guidance process that guides a second user 'B' to locate the defect that was identified by the user 'A'.

In embodiments, process 300 may begin at step 21, when user 'A' finds a region or area of interest, such as a defect associated with a to-be-inspected machine situated on a factory floor.

At step 22, user 'A' may use a mobile device to capture one or more images of the defect associated with the machine. Then, user 'A' may mark the defective area, e.g., with a bounding box overlaid on the image. User 'A' may further capture any number of images of the area surrounding the machine. For example, user 'A' may take six or more images that capture the surroundings of the machine comprising the defect. Alternatively, user 'A' may capture a video of the surroundings from which any number of frames may be extracted and processed for subsequent identification.

At step 23, the captured images may be uploaded to a remote server in the cloud and input to an AI engine (not shown in FIG. 3) to generate and output, at step 24, a description of the captured images. The image descriptions may be stored in a database, e.g., for reference, at step 25. It is noted that the images may be processed or pre-processed at any step herein.

At step 26, user 'B' may use a navigation tool, such as an indoor positioning system, to navigate to an approximate location of the machine and/or the defect that has been detected and marked by user 'A'.

At step 27, user 'B' may use a mobile application, which utilizes a camera, to take an image 'I', e.g., in the general direction of the machine at issue.

At step 28, user 'B' uploads the image to the cloud, e.g., to serve as an input to the AI engine.

At step 29, AI engine generates and outputs an image description of the image 'I'.

At step 31, the AI engine obtains the image descriptions that have been stored in the database at step 25 and compares it, at step 30, with the image description from step 29.

At step 32, the AI engine computes a direction and an amount by which the camera must be rotated to align with the image having the defect.

At step 33, based on the image descriptions, a combination of natural language, arrows, and heat maps overlaid on the camera view may be communicated to user 'B' to guide user 'B' to precisely locate the defect. In embodiments, steps 28 through 33 may be repeated, for example, until user 'B' successfully locates the defect area within a predefined accuracy level.

One skilled in the art shall recognize that: (1) certain steps may optionally be performed; (2) steps may not be limited to the specific order set forth herein; (3) certain steps may be performed in different orders; and (4) certain steps may be done concurrently.

Figure 4:
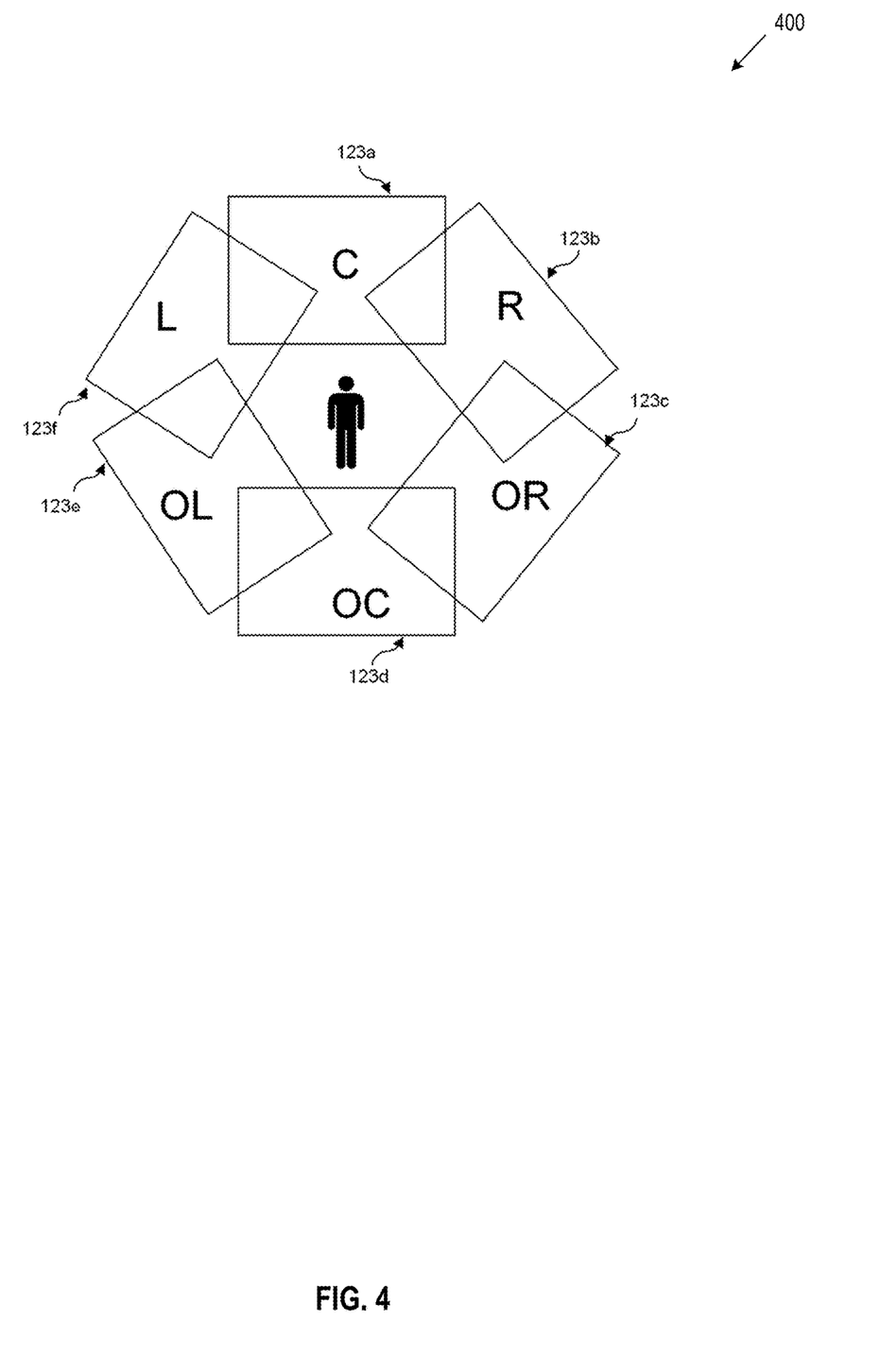
FIG. 4 illustrates examples of to-be-captured images according to various embodiments of the present disclosure.

FIG. 4 illustrates examples of to-be-captured images according to various embodiments of the present disclosure. Frames 123a-123f in arrangement 400 represent exemplary images to be captured by user 'A', assuming a camera field of view of 60 degrees. In the example in FIG. 4, 'C' represents the center image associated with a defect that has been detected. 'R' represents the right-side of the center image 'C', L represents the left-side of the center image 'C', OC represents an opposite-center location, OR represents the right-side of the image 'OC' and OL represents the left-side of the image 'OC'. It is understood that frames 123a-123f may equally be obtained from a video capture of the surroundings.

Figure 5:
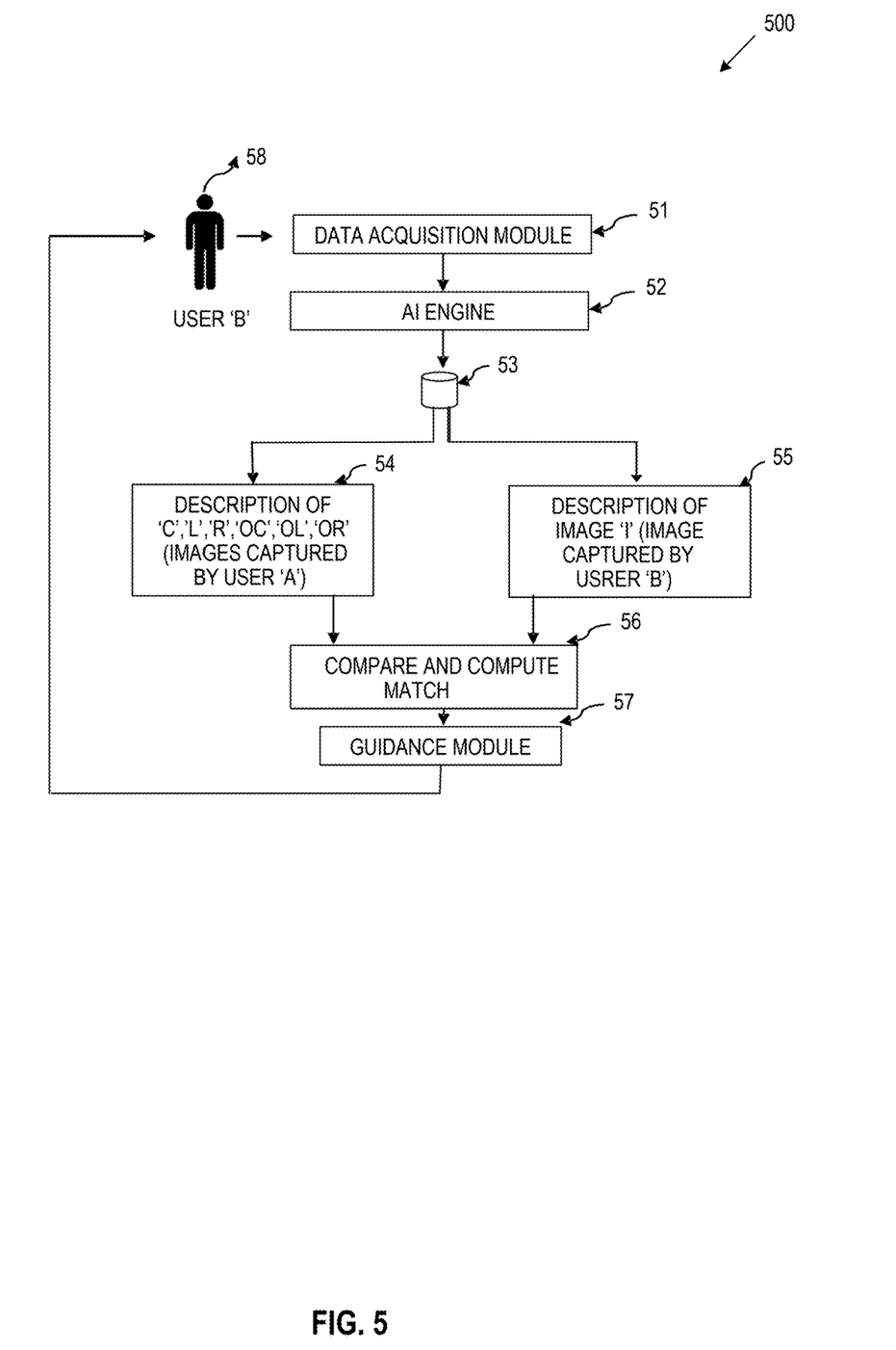
FIG. 5 illustrates a process for using a defect locator module according to various embodiments of the present disclosure.

FIG. 5 illustrates a process for using a defect locator module according to various embodiments of the present disclosure. Process 500 aids in locating a defect based on descriptions of images captured by a hypothetical user 'A' and current images captured by a hypothetical user 'B'.

In embodiments, upon arrival at the approximate location to be inspected, user 'B' 58 may use a camera, e.g., together with a mobile application on a mobile device to point the camera in some random or semi-random direction associated with the approximate location to take an image 'I', which may be communicated to data acquisition module 51.

The image and/or data associated therewith may then be communicated to AI engine 52. AI engine 52 may operate an image description generation process to generate an image description from the received data, and the generated image description may be saved in database 53.

At step 54, image descriptions of, e.g., C, L, R, OC, OL, and OR, i.e., the reference images previously captured by user 'A' are retrieved from database 53.

At step 55, the image description of image 'I' is retrieved from the database.

At step 56, the image description of image 'I' from step 55 is compared with the image descriptions from step 54.

At step 57, a guidance module may be used to generate instructions that guide user 'B' to rotate or adjust a camera view and capture an image based on that adjustment until a defect area is located in the camera view. If no defect area is located, steps 51-57 may be repeated until the defect area is successfully located.

Figure 6:
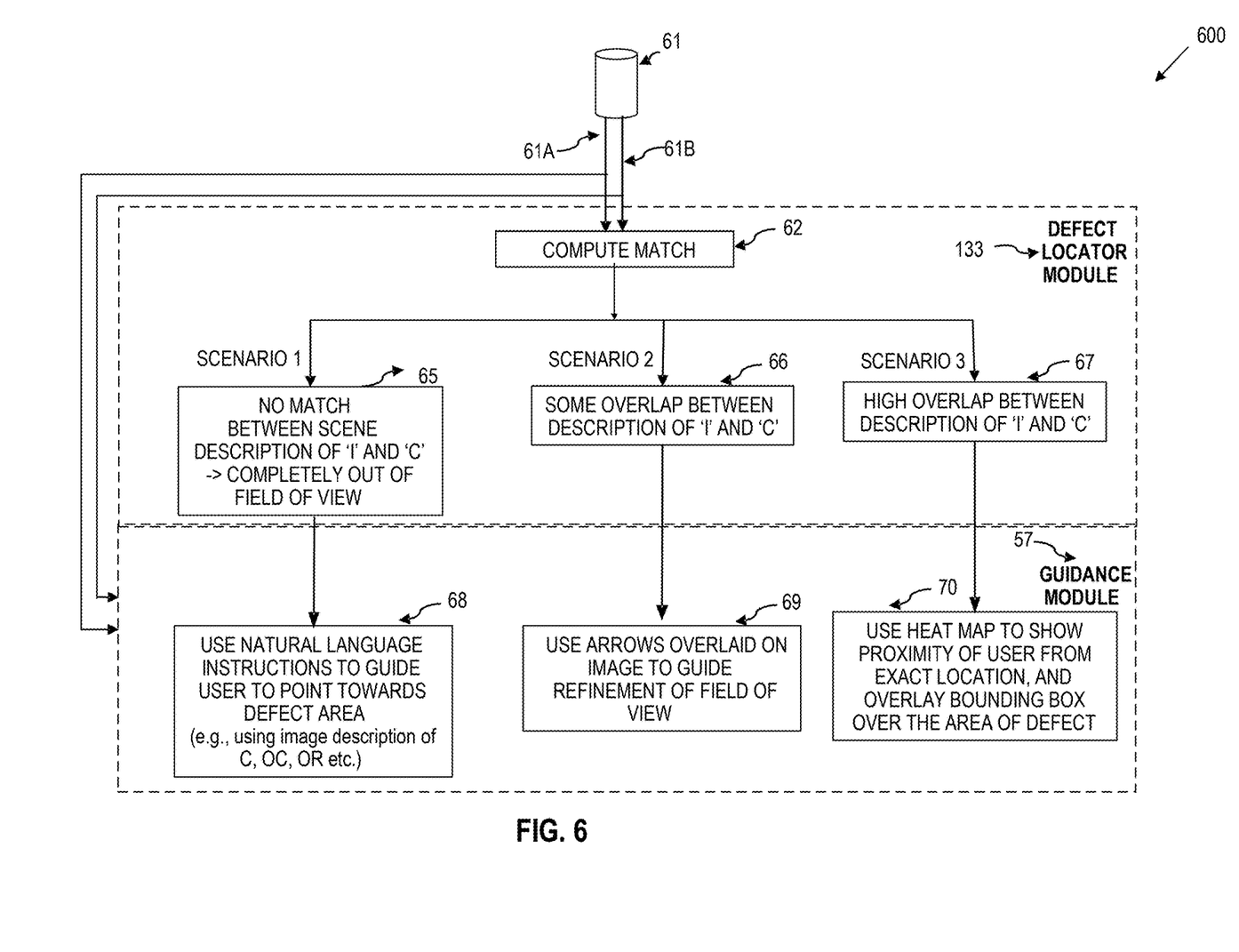
FIG. 6 illustrates a process flow involving a defect locator and a guidance module according to various embodiments of the present disclosure.

FIG. 6 illustrates a process flow involving a defect locator and a guidance module according to various embodiments of the present disclosure. As depicted process flow 600 comprises defect locator module 133 and guidance module 57, and database 61.

In embodiments, image descriptions 61a of surrounding images captured by user 'A' (i.e., 'C', 'OC', 'OR', etc.) and an image description 61b of an image captured by user 'B' may be retrieved from database 61 and input to defect locator module 133. Defect locator module 133 may compare the descriptions and, based on a match in the computed descriptions, guidance module 57 may guide user 'B' to make adjustments to the camera view. It is noted that image descriptions 61a and 61b may also serve as inputs to guidance module 57, e.g., to enable that generation of instructions in natural language based on the descriptions.

As depicted in FIG. 6, several possible scenarios exist. For example, in a first scenario, when at step 65 a scene description of image 'I' 61a does not match the scene description 'C', user 'B's camera may have been pointing in an irrelevant direction. In this setting 68, user 'B' may be provided guidance using natural language to adjust the direction/orientation of the camera based on the image descriptions.

In a second scenario, when at step 66 a scene description of image 'I' 61b has some overlap with the scene description of 'C', user 'B's camera is closer in proximity to 'C'. In this setting 69, arrows overlaid on an image may guide user 'B' in adjusting the direction and/or orientation of the camera.

In a third scenario, when at step 67 a scene description of image 'I' 61b has a high degree of overlap with the scene description of 'C', user 'B's camera is relatively close to the area of defect to be located. In this setting 70, a combination of heat maps that show the user's proximity from the area of defect as well as a bounding box over the area of defect may be employed to guide user 'B' to accurately locate the area of defect.

These embodiments illustrate that a guidance module may output any one of natural language instruction, overlaid arrows, and heat maps. A person of skill in the art will appreciate that, depending on the particular setting, a combination of steps 65, 66, and 67 may be used to enhance the outcome.

Figure 7:
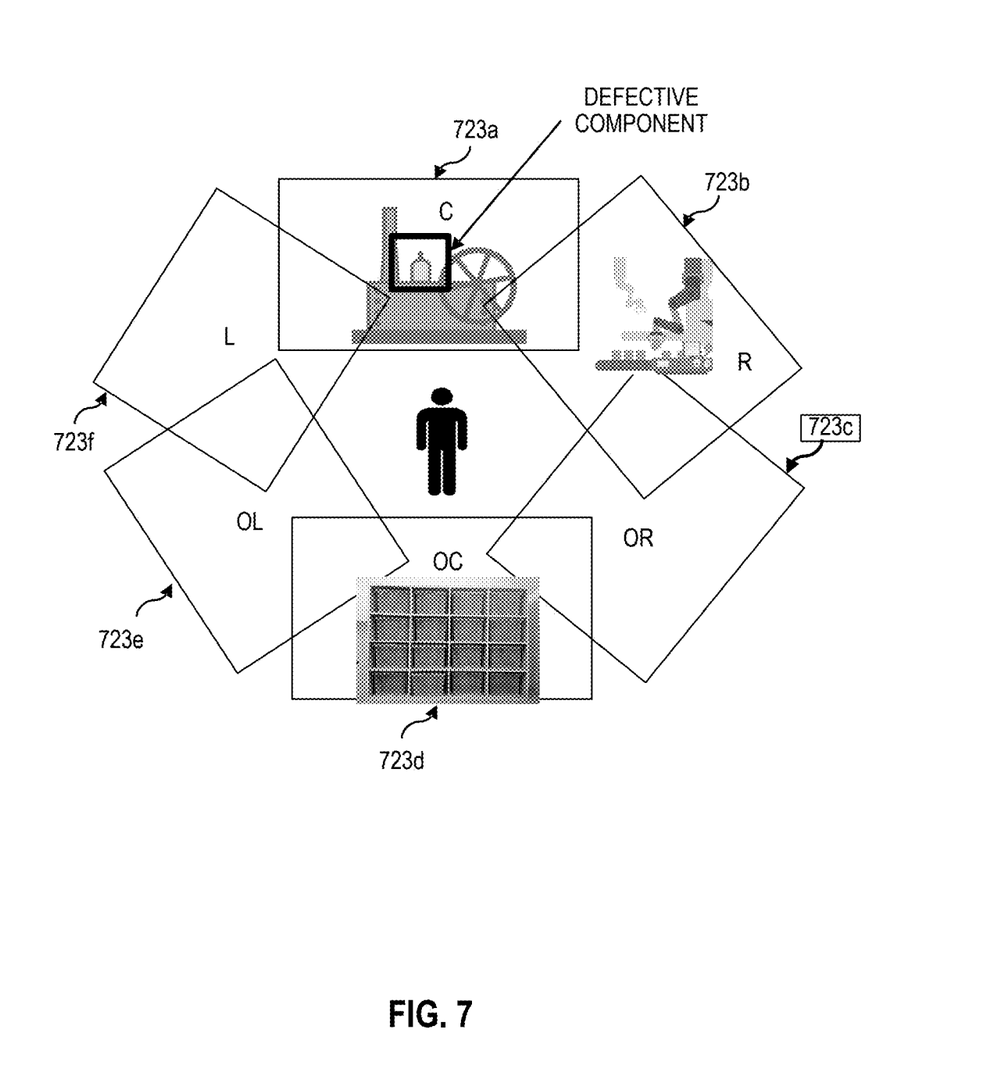
FIG. 7 illustrates an image captured by user 'A' that comprises a defect and surrounding areas according to various embodiments of the present disclosure.
Figure 8:
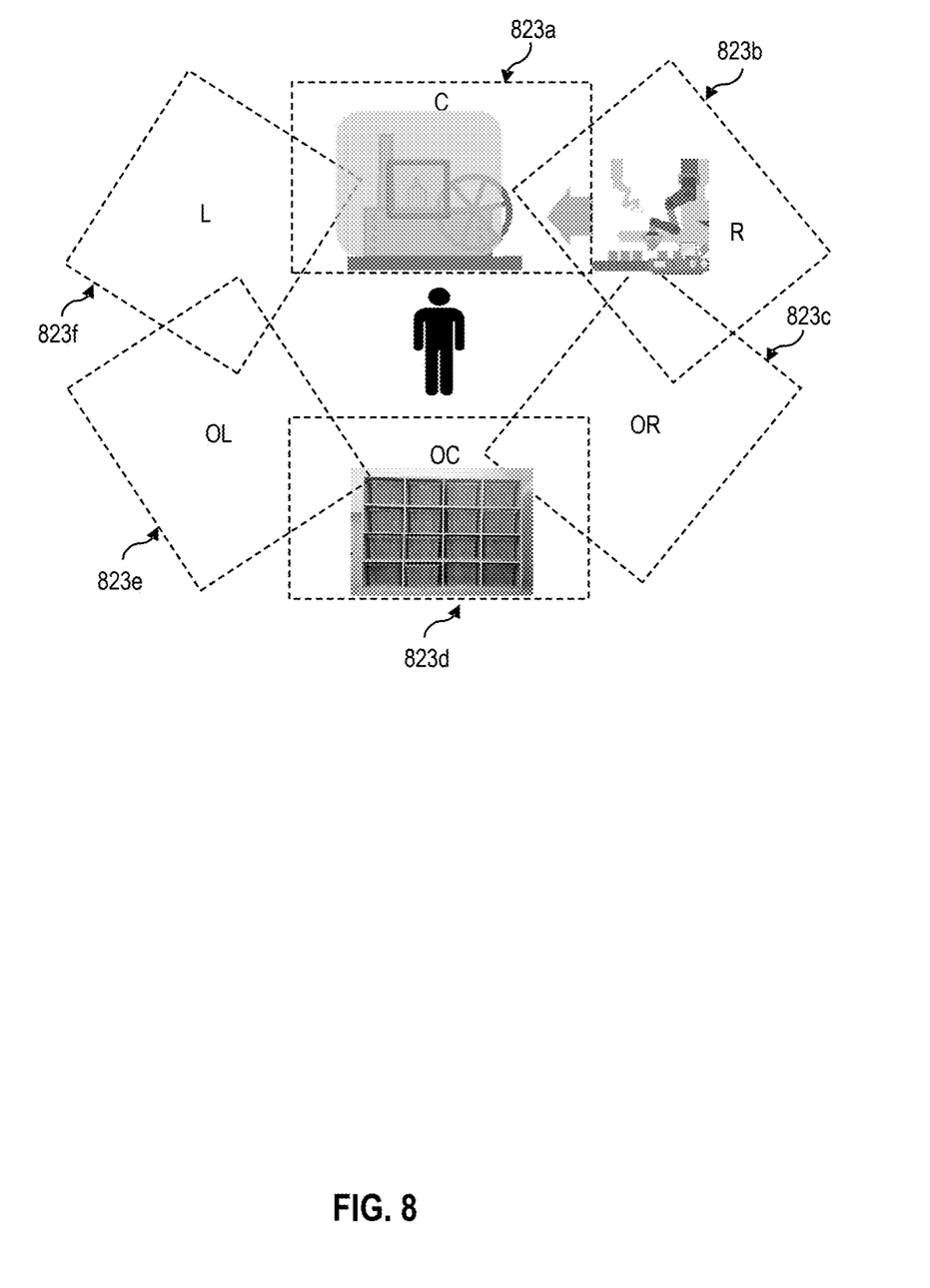
FIG. 8 illustrates guidance module outputs that are based on three exemplary scenarios where user 'B' points a camera.

FIG. 7 illustrates an image captured by user 'A' that comprises a defect or defective component and surrounding areas according to various embodiments of the present disclosure. As depicted, image 'C' in arrangement 700 and surrounding images 'R', 'OR', 'OL', 'OC', and 'L', correspond to numbers 723a-723f, respectively. FIG. 8 illustrates guidance module outputs that are based on three exemplary scenarios where user 'B' points a camera. Similar to FIG. 7, image 'C' in FIG. 8 and surrounding images 'R', 'OR', 'OL', 'OC', and 'L', correspond to numbers 823a-823f.

In FIG. 8, scenario 1 represents user 'B' pointing a camera in the direction of 'OC'. In this setting, the guidance module may use image descriptions to output an instruction, e.g., in natural language, such as "Look completely away from the wooden storage racks." Scenario 2 represents user 'B' pointing the camera in the direction of 'R', i.e., an area close to 'C'. In this setting, the guidance module may output the natural language instruction "Look towards the left of the robotic arm at the conveyor belt" and generate overlay arrow 802 on the camera view, which corresponds to an instruction to follow the arrow overlaid in the image. Scenario 3 represents user 'B' pointing the camera in the direction of 'C', the guidance module may output a natural language instruction "Look to the left of the wheel. Follow the heat map and the highlighted area showing the defect." The guidance module may further generate a heat map to guide user 'B' proximity to the defect area along with a bounding box highlighting the defect area.

Advantageously, these embodiments enable the accurate mapping of an area captured through images to the corresponding physical location. They significantly reduce the time and effort required to guide a user to the precise inspection area. Additionally, such embodiments offer a human-centric interface that interactively guides the user to the region of interest using a combination of natural language and visual cues, thereby enhancing the user experience and overall efficiency.

Figure 9:
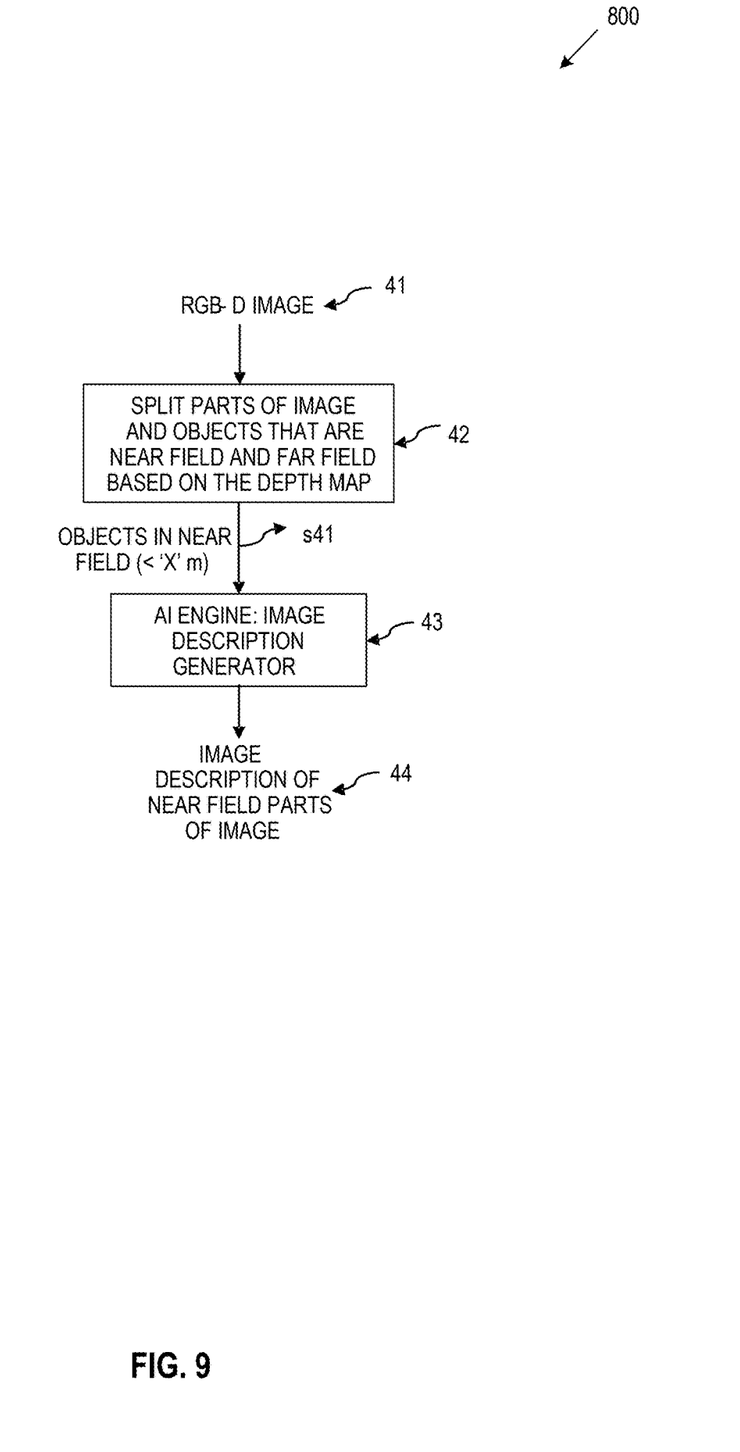
FIG. 9 illustrates a process for combining a depth map with an RGB image according to various embodiments of the present disclosure.

FIG. 9 illustrates a process for combining a depth map with an RGB image according to various embodiments of the present disclosure. At step 41 of process 800, an RGB-D image, which combines a depth map with an RGB image, serves as an input that provides enhanced capabilities for refining the image description process.

At step 42, the depth map can be utilized as a filter to focus on regions of the image that are in the near-field (i.e., close to the area of interest) and discard regions in the background, such as to filter out the background and keep the near-field regions of the image.

At step 43, the near-field regions may then be provided to an AI engine to enable a more accurate and detailed image description generation. The image description of near-field parts of the image is output at step 44.

Figure 10:
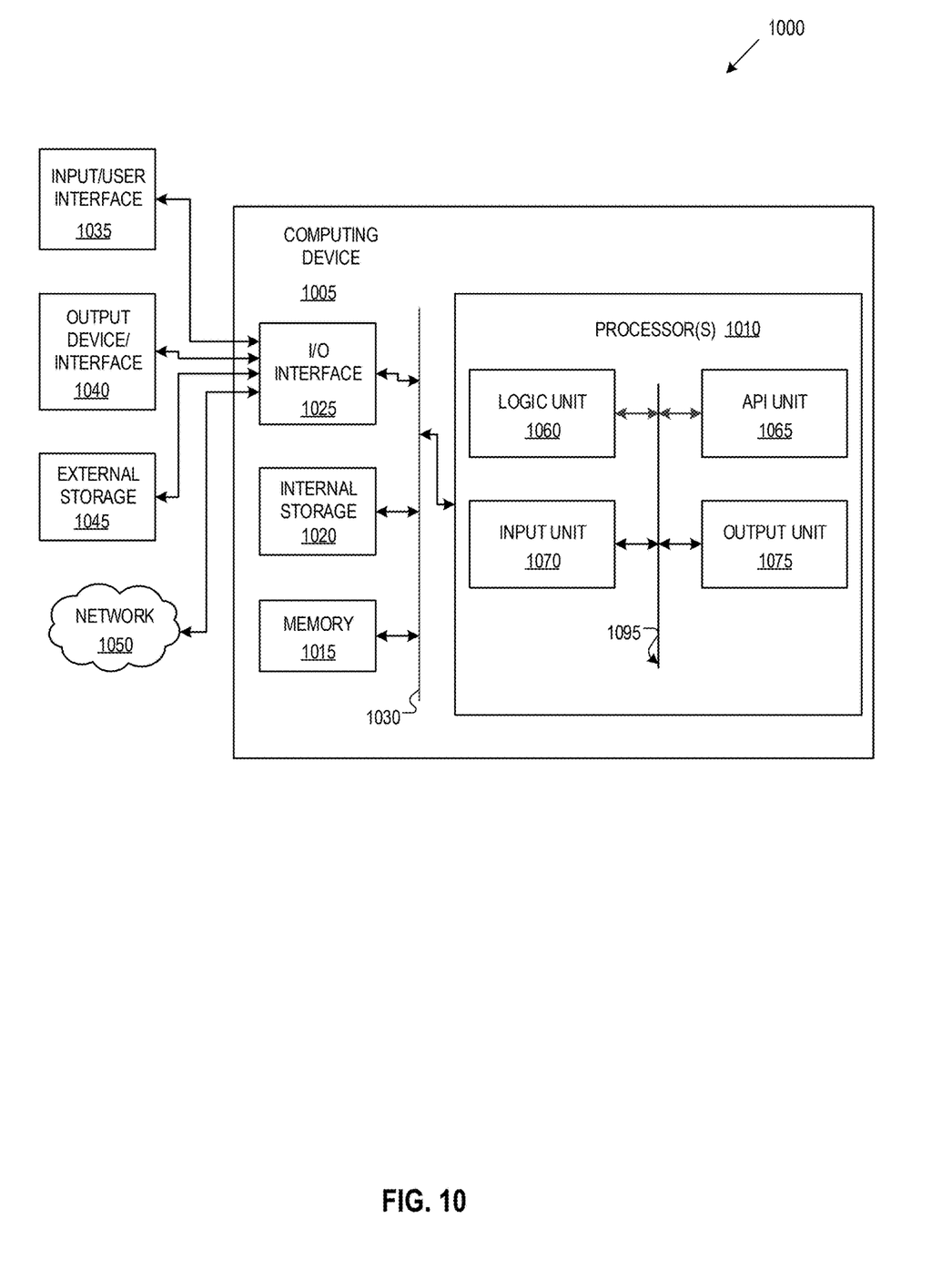
FIG. 10 illustrates an example computing environment with an example computer device suitable for use in some example implementations according to various embodiments of the present disclosure.

It is noted that although the invention is generally described in the context of defect detection, it is understood that this is not intended to limit the scope of the present disclosure to such embodiments as the systems and methods for locating objects described herein may be used in any other camera-based techniques.

FIG. 10 illustrates an example computing environment with an example computer device suitable for use in some example implementations according to various embodiments of the present disclosure. Computer device 1005 in computing environment 1000 can include one or more processing units, cores, or processors 1010, memory 1015 (e.g., RAM, ROM, and/or the like), internal storage 1020 (e.g., magnetic, optical, solid-state storage, and/or organic), and/or I/O interface 1025, any of which can be coupled on a communication mechanism or bus 1030 for communicating information or embedded in the computer device 1005. I/O interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configurations. Computer device 1005 or any connected computer device can be functioning as, providing services of, or referred to as a server, client, thin server, general machine, special-purpose machine, or another label.

I/O interface 1025 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, a satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, and output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Processor(s) 1010 can be configured to execute a method or computer instructions which can involve, in response to receiving a set of images associated with a first area of interest, processing the set of images to generate a first image description and communicating the first image description and the set of images to a user device to enable a user of the user device to locate a second area of interest, as described, for example, with respect to FIG. 2 and FIG. 3.

Processor(s) 1010 can be configured to execute a method or computer instructions which can involve, in response to the user navigating to the second area of interest, using a positioning system and capturing a new image by pointing a camera in any direction, obtaining the new image at the system and processing the new image, as described, for example, with respect to FIG. 3.

Processor(s) 1010 can be configured to execute a method or computer instructions which can involve obtaining a second image description associated with the new image, wherein at least one of the first image description or the second image description includes natural language, as described, for example, with respect to FIG. 6.

Processor(s) 1010 can be configured to execute a method or computer instructions which can involve comparing the first image description with the second image description to obtain a comparison result and, based on the comparison result, communicating to the user device instructions for adjusting the camera as described, for example, with respect to FIG. 5 and FIG. 6.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities to achieve a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as optical disks, magnetic disks, read-only memories, random access memories, solid-state devices, drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for locating a physical object by using a set of images, the method comprising:
   in response to receiving, at a system, a set of images associated with a first area of interest, processing the set of images to generate a first image description;
   communicating the first image description and the set of images to a user device to enable a user of the user device to locate a second area of interest;
   in response to the user navigating to the second area of interest, using a positioning system and capturing a new image by pointing a camera in any direction, obtaining the new image at the system and processing the new image;
   obtaining a second image description associated with the new image, wherein at least one of the first image description or the second image description comprises natural language;
   comparing the first image description with the second image description to obtain a comparison result; and
   based on the comparison result, communicating to the user device instructions for adjusting the camera.

2. The method of claim 1, wherein communicating comprises, in response to the camera pointing to any direction, communicating to the user device instructions that cause at least one of an instruction in natural language, an arrow to be displayed on the image, a heat map indicating a proximity to the first area of interest, or a bounding box indicating the first area of interest, or any of their combination.

3. The method of claim 1, further comprising iteratively performing guidance steps until the first area of interest satisfies at least one of a predefined accuracy or a stop condition.

4. The method of claim 1, wherein the instruction in natural language describes physical objects and their relationships to the first area of interest.

5. The method of claim 1, wherein the comparison result is used to determine a direction and/or an amount of a camera adjustment.

6. The method of claim 1, wherein the system uses an image description algorithm to process at least one of the new image or the first image.

7. The method of claim 1, further comprising combining a depth map with one or more RGB images.

8. The method of claim 7, wherein the combining enhances an accuracy of the first image description or the second image description.

9. A non-transitory computer-readable medium for storing instructions for executing a process, the instructions comprising:

in response to receiving, at a system, a set of images associated with a first area of interest, processing the set of images to generate a first image description;

communicating the first image description and set of images to a user device to enable a user of the user device to locate a second area of interest;

in response to the user navigating to the second area of interest, using a positioning system and capturing a new image by pointing a camera in any direction, obtaining the new image at the system and processing the new image;

obtaining a second image description associated with the new image, wherein at least one of the first image description or the second image description comprises natural language;

comparing the first image description with the second image description to obtain a comparison result; and based on the comparison result, communicating to the user device instructions for adjusting the camera.

10. The non-transitory computer-readable medium of claim 9, wherein the step of communicating comprises, in response to the camera pointing to any direction, communicating to the user device instructions that cause at least one of an instruction in natural language, an arrow to be displayed on the image, a heat map indicating a proximity to the first area of interest, or a bounding box indicating the first area of interest, or any of their combination.

11. The non-transitory computer-readable medium of claim 9, further comprising iteratively performing guidance steps until the first area of interest satisfies at least one of a predefined accuracy or a stop condition.

12. The non-transitory computer-readable medium of claim 9 wherein the instruction in natural language describes physical objects and their relationships to the first area of interest.

13. The non-transitory computer-readable medium of claim 9 wherein the comparison result is used to determine a direction and/or an amount of a camera adjustment.

14. The non-transitory computer-readable medium of claim 9, wherein the system uses an image description algorithm to process at least one of the new image or the first image.

15. The non-transitory computer-readable medium of claim 9, further comprising combining a depth map with one or more RGB images.

16. A system for locating a physical object by using a set of images, the system comprising:

a first interface configured to receive a set of images associated with a first area of interest;

a second interface configured to couple to a user device;

a processor, configured to:

in response to receiving, at the first interface, the set of images, process the set of images to generate a first image description;

communicate the first image description and the set of images to the user device to enable a user of the user device to locate a second area of interest;

in response to the user navigating to the second area of interest, using a positioning system and capturing a new image by pointing a camera in any direction, obtain the new image at the second interface and processing the new image;

obtain a second image description associated with the new image, wherein at least one of the first image description or the second image description comprises natural language;

compare the first image description with the second image description to obtain a comparison result; and based on the comparison result, communicate to the user device instructions for adjusting the camera.

17. The system of claim 16, wherein the processor uses the comparison result to determine a direction and/or an amount of a camera adjustment.

18. The system of claim 16, wherein the processor combines a depth map with one or more RGB images.

19. The system of claim 16, wherein communicating comprises, in response to the camera pointing to any direction, communicating to the user device instructions that cause at least one of an instruction in natural language, an arrow to be displayed on the image, a heat map indicating a proximity to the first area of interest, or a bounding box indicating the first area of interest, or any of their combination.

20. The system of claim 16, wherein the instruction in natural language describes physical objects and their relationships to the first area of interest.

* * * * *